United States Patent
Lee et al.

(10) Patent No.: US 11,824,193 B2
(45) Date of Patent: Nov. 21, 2023

(54) METHOD OF MANUFACTURING POSITIVE ELECTRODE ACTIVE MATERIAL

(71) Applicant: LG Chem, Ltd., Seoul (KR)

(72) Inventors: Woo Ram Lee, Daejeon (KR); Woo Hyun Kim, Daejeon (KR); Dong Jin Kim, Daejeon (KR); Hwa Seok Chae, Daejeon (KR); Hyun Uk Kim, Daejeon (KR)

(73) Assignee: LG Chem, Ltd.

( * ) Notice: Subject to any disclaimer, the term of this patent is extended or adjusted under 35 U.S.C. 154(b) by 183 days.

(21) Appl. No.: 17/613,276

(22) PCT Filed: Mar. 23, 2021

(86) PCT No.: PCT/KR2021/003563
§ 371 (c)(1),
(2) Date: Nov. 22, 2021

(87) PCT Pub. No.: WO2021/194212
PCT Pub. Date: Sep. 30, 2021

(65) Prior Publication Data
US 2022/0231289 A1    Jul. 21, 2022

(30) Foreign Application Priority Data

Mar. 26, 2020 (KR) .................. 10-2020-0036937

(51) Int. Cl.
| | | |
|---|---|---|
| H01M 4/525 | (2010.01) | |
| H01M 4/04 | (2006.01) | |
| H01M 4/505 | (2010.01) | |
| C01G 53/00 | (2006.01) | |
| H01M 4/02 | (2006.01) | |

(52) U.S. Cl.
CPC .......... *H01M 4/525* (2013.01); *C01G 53/50* (2013.01); *H01M 4/0471* (2013.01); *H01M 4/0497* (2013.01); *H01M 4/505* (2013.01); *C01P 2002/60* (2013.01); *C01P 2004/61* (2013.01); *C01P 2006/40* (2013.01); *H01M 2004/021* (2013.01); *H01M 2004/028* (2013.01)

(58) Field of Classification Search
None
See application file for complete search history.

(56) References Cited

U.S. PATENT DOCUMENTS

| | | |
|---|---|---|
| 2011/0305954 A1 | 12/2011 | Kim et al. |
| 2012/0256337 A1 | 10/2012 | Yokoyama et al. |
| 2016/0049647 A1 | 2/2016 | Park et al. |
| 2018/0026267 A1 | 1/2018 | Kim et al. |
| 2018/0048015 A1 | 2/2018 | Lee et al. |
| 2018/0108940 A1 | 4/2018 | Kwon et al. |
| 2019/0020022 A1 | 1/2019 | Jeong et al. |
| 2019/0260024 A1 | 8/2019 | Nakamura et al. |
| 2022/0399544 A1 | 12/2022 | Nakamura et al. |

FOREIGN PATENT DOCUMENTS

| | | |
|---|---|---|
| CN | 106058205 A | 10/2016 |
| CN | 110330060 A | 10/2019 |
| JP | H11246226 A | 9/1999 |
| JP | 2002304992 A | 10/2002 |
| JP | 4594605 B2 | 12/2010 |
| JP | 2014049407 A | 3/2014 |
| JP | 2018014325 A | 1/2018 |
| JP | 2018515884 A | 6/2018 |
| JP | 2018536972 A | 12/2018 |
| JP | 2019106240 A | 6/2019 |
| JP | 2019149349 A | 9/2019 |
| JP | 2020-033235 A | 3/2020 |
| KR | 20110136002 A | 12/2011 |
| KR | 20130138147 A | 12/2013 |
| KR | 20180010123 A | 1/2018 |
| KR | 20180063862 A | 6/2018 |
| KR | 101913897 B1 | 12/2018 |
| KR | 101937896 B1 | 1/2019 |
| WO | 2012137533 A1 | 10/2012 |
| WO | 2016175597 A1 | 11/2016 |
| WO | 2018020845 A1 | 2/2018 |

OTHER PUBLICATIONS

Search report from International Application No. PCT/KR2021/003563, dated Jul. 1, 2021.

*Primary Examiner* — Tanisha Diggs
(74) *Attorney, Agent, or Firm* — Lerner David LLP

(57) ABSTRACT

Provided is a method of manufacturing a positive electrode active material, which includes: (A) preparing a positive electrode active material precursor which includes a core portion including randomly aggregated primary particles and a shell portion surrounding the core portion and formed of primary particles oriented in a direction from a particle center to the outside and in which a ratio of a crystal grain size in the (100) plane to a crystal grain size in the (001) plane of the primary particles forming the shell portion is 3 or more; and (B) mixing the positive electrode active material precursor with a lithium-containing raw material and firing the mixture, wherein the lithium transition metal oxide has an average particle diameter ($D_{50}$) that is 0.01% to 20% reduced as compared to an average particle diameter ($D_{50}$) of the positive electrode active material precursor.

14 Claims, No Drawings

METHOD OF MANUFACTURING POSITIVE ELECTRODE ACTIVE MATERIAL

CROSS-REFERENCE TO RELATED APPLICATIONS

The present application is a national phase entry under § 371 of International Application No. PCT/KR2021/003563 filed on Mar. 23, 2021, which claims priority from Korean Patent Application No. 10-2020-0036937, filed on Mar. 26, 2020, the disclosures of which are incorporated herein by reference in their entirety.

TECHNICAL FIELD

The present invention relates to a method of manufacturing a positive electrode active material.

BACKGROUND ART

Due to developments in technology and increased demand for mobile devices, the demand for secondary batteries as an energy source is rapidly increasing. Among these secondary batteries, lithium secondary batteries having a high energy density and a high voltage, a long cycle lifespan, and a low self-discharge rate have been commercialized and are widely used.

Lithium transition metal composite oxides have been used as positive electrode active materials for lithium secondary batteries, and among these, lithium cobalt composite metal oxides such as $LiCoO_2$, which have a high operating voltage and excellent capacity characteristics, have been mainly used. However, $LiCoO_2$ has an unstable crystal structure due to lithium deintercalation and thus has poor thermal properties. In addition, since $LiCoO_2$ is expensive, it has limitations in mass use thereof as a power source in fields such as electric vehicles.

As an alternative for $LiCoO_2$, a lithium manganese composite metal oxide ($LiMnO_2$, $LiMn_2O_4$, or the like), a lithium iron phosphate compound ($LiFePO_4$ or the like), or a lithium nickel composite metal oxide ($LiNiO_2$ or the like) was developed. Among these, there have been particularly active research efforts to develop lithium nickel composite metal oxides which can easily implement a high-capacity battery due to having a high reversible capacity of about 200 mAh/g. However, the $LiNiO_2$ has problems such as low thermal stability as compared to $LiCoO_2$, and when an internal short circuit occurs in a charged state due to pressure applied from the outside or the like, the positive electrode active material itself is decomposed, causing the battery to rupture and ignite. Accordingly, as a way to improve the low thermal stability while retaining the excellent reversible capacity of $LiNiO_2$, a lithium transition metal oxide in which a part of nickel (Ni) is substituted with cobalt (Co), manganese (Mn), or aluminum (Al) has been developed.

In the case of lithium ion batteries in which such a lithium transition metal oxide, particularly, a lithium transition metal oxide having a high Ni content (Ni-rich) is used as a positive electrode active material, the capacity of the battery, whether a high output is generated, and whether gas is generated at high temperature are affected not only by chemical properties such as the composition of the positive electrode active material, the amount of impurities, and the amount of lithium by-products present on the surface but also by physical properties such as the size, surface area, density, and shape of the positive electrode active material particles.

Meanwhile, in the process of mixing a positive electrode active material precursor with a lithium compound and firing the same to synthesize the above-described lithium transition metal oxide, the physical properties of the positive electrode active material precursor are greatly changed.

Accordingly, there is a need for a method of manufacturing a positive electrode active material which is capable of appropriately controlling the physical properties that change during the manufacture of a positive electrode active material and thus increasing the mechanical strength of a positive electrode active material and improving the capacity characteristics and resistance characteristics of a battery to which the positive electrode active material is applied.

DISCLOSURE

Technical Problem

The present invention is directed to providing a method of manufacturing a positive electrode active material, in which a particle size is reduced during the manufacture of a positive electrode active material and thus particle strength and energy density are improved.

Technical Solution

One aspect of the present invention provides a method of manufacturing a positive electrode active material, which includes: (A) preparing a positive electrode active material precursor which includes a core portion including randomly aggregated primary particles and a shell portion surrounding the core portion and formed of primary particles oriented in a direction from a particle center to the outside and in which a ratio of a crystal grain size in the (100) plane to a crystal grain size in the (001) plane of the primary particles forming the shell portion is 3 or more; and (B) mixing the positive electrode active material precursor with a lithium-containing raw material and firing the mixture, and thus preparing a lithium transition metal oxide, wherein the lithium transition metal oxide has an average particle diameter ($D_{50}$) that is 0.01% to 20% reduced as compared to an average particle diameter ($D_{50}$) of the positive electrode active material precursor.

Advantageous Effects

According to the present invention, a positive electrode active material is manufactured using a positive electrode active material precursor which includes a core portion including randomly aggregated primary particles and a shell portion surrounding the core portion and formed of primary particles oriented in a direction from a particle center to the outside and in which a ratio of a crystal grain size in the (100) plane to a crystal grain size in the (001) plane of the primary particles forming the shell portion is 3 or more. Since the lithium transition metal oxide particles are a specific percent smaller than the positive electrode active material precursor particles, the density of particles is increased and thus the mechanical strength of the positive electrode active material can be improved, and when this positive electrode active material is applied to a secondary battery, the capacity characteristics of the battery and the like can be improved.

BEST MODE

Terms and words used in this specification and the claims should not be interpreted as being limited to commonly used meanings or meanings in dictionaries, and, based on the principle that the inventors can appropriately define concepts of terms in order to describe their invention in the best way, the terms and words should be interpreted with meanings and concepts which are consistent with the technical spirit of the present invention.

It will be understood that terms such as "comprises," "comprising," "includes," "including," "has" or "having," when used in the present specification, specify the presence of stated features, numbers, steps, components, or combinations thereof and do not preclude the possibility of the presence or addition of one or more other features, numbers, steps, components, or combinations thereof.

In the present specification, "particle" refers to a grain having a micrometer-scale size, "primary particle" refers to a primary structure of a single particle, and "secondary particle" refers to an aggregate, that is, a secondary structure, formed as a result of primary particle agglomeration caused by physical or chemical bonding between primary particles, even without a process for intentional agglomeration or assembly of primary particles forming the secondary particle.

In the present specification, a ratio of a crystal grain size in the (100) plane to a crystal grain size in the (001) plane of primary particles forming a shell portion is a value obtained by dividing a crystal grain size calculated by the Scherrer equation using a full width at half maximum (FWHM) of a (100) peak measured using X-ray diffraction (XRD) by a crystal grain size calculated by the Scherrer equation using an FWHM of a (001) peak.

In the present specification, an average particle diameter ($D_{50}$) may be defined as a particle diameter corresponding to the 50% cumulative volume in a particle diameter distribution curve. The average particle diameter ($D_{50}$) may be measured using, for example, a laser diffraction method. The laser diffraction method generally allows for the measurement of a particle diameter ranging from a submicron level to several millimeters and can produce a result having high reproducibility and high resolution.

Hereinafter, the present invention will be described in detail.

Method of Manufacturing Positive Electrode Active Material

The present inventors have found, based on the fact that the physical properties of a positive electrode active material precursor change during a process of manufacturing a positive electrode active material, that positive electrode active material particles having a high density can be prepared by reducing unnecessary voids in particles, and thereby completed the present invention.

A method of manufacturing a positive electrode active material of the present invention includes: (A) preparing a positive electrode active material precursor which includes a core portion including randomly aggregated primary particles and a shell portion surrounding the core portion and formed of primary particles oriented in a direction from a particle center to the outside and in which a ratio of a crystal grain size in the (100) plane to a crystal grain size in the (001) plane of the primary particles forming the shell portion is 3 or more; and (B) mixing the positive electrode active material precursor with a lithium-containing raw material and firing the mixture, and thus preparing a lithium transition metal oxide. In addition, the lithium transition metal oxide has an average particle diameter ($D_{50}$) that is 0.01% to 20% reduced as compared to an average particle diameter ($D_{50}$) of the positive electrode active material precursor.

The method of manufacturing a positive electrode active material of the present invention may additionally include (C) mixing the lithium transition metal oxide with a coating element-containing raw material and thermally treating the mixture and thus forming a coating layer on a surface of the lithium transition metal oxide.

Hereinafter, each step of the method of manufacturing a positive active material will be described in detail.

Step (A)

In the method of manufacturing a positive electrode active material of the present invention, first, a positive electrode active material precursor which includes a core portion including randomly aggregated primary particles and a shell portion surrounding the core portion and formed of primary particles oriented in a direction from a particle center to the outside and in which a ratio of a crystal grain size in the (100) plane to a crystal grain size in the (001) plane of the primary particles forming the shell portion is 3 or more is prepared.

According to the present invention, since a positive electrode active material is manufactured using a positive electrode active material precursor which includes a core portion including randomly aggregated primary particles and a shell portion surrounding the core portion and formed of primary particles oriented in a direction from a particle center to the outside and in which a ratio of a crystal grain size in the (100) plane to a crystal grain size in the (001) plane of the primary particles forming the shell portion is 3 or more, the lithium transition metal oxide particles may be a specific percent smaller than the positive electrode active material precursor particles, and since the density of particles is accordingly increased, the mechanical strength of the positive electrode active material can be improved, and when this positive electrode active material is applied to a secondary battery, the capacity characteristics of the battery can be improved.

According to the present invention, a ratio of a crystal grain size in the (100) plane to a crystal grain size in the (001) plane of the primary particles forming the shell portion of the positive electrode active material precursor may be 3 or more and specifically 3 to 6. In this case, since the lengths at which lithium ions can move without being interrupted in the primary particles become relatively long, lithium mobility can be more effectively improved. In addition, a positive electrode active material manufactured using this positive electrode active material precursor may have high particle density.

According to the present invention, in the positive electrode active material precursor, a ratio of the length of the shell portion to the diameter of the core portion may be 1 or more. A positive electrode active material manufactured using this positive electrode active material precursor may have high particle density and, due to the large area occupied by the shell portion, may have excellent lithium mobility.

According to the present invention, step (A) may include a method of preparing a positive electrode active material precursor including: a first step of forming positive electrode active material precursor particles by a co-precipitation reaction while supplying raw materials to a reactor having a filtering unit and an extraction unit; a second step of maintaining a constant level of a reaction solution by discharging a reaction solution filtrate, from which solids have been removed, through the filtering unit when the reaction solution reaches a specific level in the reactor; and a third step of maintaining a solids concentration of the reaction solution to be below a specific level by extracting a part of the reaction solution including the positive electrode active material precursor through the extraction unit and discharging the same to a liquid-collecting tank. That is, the positive electrode active material precursor may be prepared by the method of preparing a positive electrode active material precursor described above. In this case, since the growth of crystal grains is suppressed on the (001) plane, crystal grains formed on the (100) plane may be relatively dominant in size, and accordingly, the ratio of a crystal grain size in the (100) plane to a crystal grain size in the (001) plane of the primary particles forming the shell portion of the positive electrode active material precursor may be 3 or more and specifically 3 to 6. In addition, since the positive electrode active material precursor has a small core portion and a long shell portion, a positive electrode active material precursor having excellent lithium mobility can be obtained.

In the method for preparing a positive electrode active material precursor, first, raw materials are continuously supplied to a reactor including a filtering unit and an extraction unit. The raw materials may be continuously supplied to the reactor through an input unit provided in the reactor. The raw materials may be mixed in the reactor and thus form a reaction solution, and positive electrode active material precursor particles may be formed through a co-precipitation reaction of the reaction solution (first step).

Here, the filtering unit is disposed inside the reactor and used for discharging a reaction solution filtrate, from which solids have been removed, to the outside of the reactor when the reaction solution reaches a specific level, and the extraction unit is used for maintaining the solid content of the reaction solution to be below a specific level by extracting a part of the reaction solution and discharging the same to a liquid-collecting tank. In addition, the reactor is used for receiving the reaction solution and carrying out a co-precipitation reaction to generate a positive electrode active material precursor.

Meanwhile, the raw materials may include a transition metal-containing solution, an ammonium ion-containing solution, and a basic aqueous solution.

The transition metal included in the transition metal-containing solution may be Ni, Co, $M^1$ (here, $M^1$ is one or more selected from the group consisting of Mn and Al), or the like. Specifically, the transition metal-containing solution may include the acetates, nitrates, sulfates, halides, sulfides, hydroxides, oxides, or oxyhydroxides of transition metals, and these are not particularly limited and can be used as long as they are soluble in water.

For example, the Ni may be included in the form of $Ni(OH)_2$, NiO, NiOOH, $NiCO_3 \cdot 2Ni(OH)_2 \cdot 4H_2O$, $NiC_2O_2 \cdot 2H_2O$, $Ni(NO_3)_2 \cdot 6H_2O$, $NiSO_4$, $NiSO_4 \cdot 6H_2O$, a fatty acid nickel salt, a nickel halide, or the like in the transition metal-containing solution, and one or more thereof may be used. Meanwhile, the amount of Ni may be adjusted so that the content thereof becomes 60 mol % or more based on the total number of moles of the transition metal.

In addition, the Co may be included in the form of $Co(OH)_2$, CoOOH, $Co(OCOCH_3)_2 \cdot 4H_2O$, $Co(NO_3)_2 \cdot 6H_2O$, $CoSO_4 \cdot 7H_2O$, or the like in the transition metal-containing solution, and one or more thereof may be used.

In addition, when the $M^1$ is Mn, the Mn may be included in the form of a manganese oxide (e.g., $Mn_2O_3$, $MnO_2$, and $Mn_3O_4$), a manganese salt (e.g., $MnCO_3$, $Mn(NO_3)_2$, $MnSO_4$, manganese acetate, manganese dicarboxylate, manganese citrate, and a fatty acid manganese salt), manganese oxyhydroxide, manganese chloride, or the like in the transition metal-containing solution, and one or more thereof may be used.

In addition, when the $M^1$ is Al, the Al may be included in the form of an acetate, nitrate, sulfate, halide, sulfide, hydroxide, oxide, oxyhydroxide, or the like containing Al in the transition metal-containing solution.

In addition, the transition metal-containing solution may include another metal element ($M^2$) in addition to Ni, Co, and $M^1$. Here, the metal element $M^2$ may include one or more selected from the group consisting of Zr, B, W, Mo, Cr, Nb, Mg, Hf, Ta, La, Ti, Sr, Ba, Ce, F, P, S, and Y.

When the transition metal-containing solution additionally includes the metal element $M^2$, a raw material containing the metal element $M^2$ may be additionally added when preparing the transition metal-containing solution.

As the raw material containing the metal element $M^2$, one or more selected from the group consisting of an acetate, a nitrate, a sulfate, a halide, a sulfide, a hydroxide, an oxide, and an oxyhydroxide which contain the metal element $M^2$ may be used. For example, when the metal element $M^2$ is tungsten (W), tungsten oxide or the like may be used.

Meanwhile, the $M^1$- or $M^2$-containing raw material may be added in a powder state and doped in the step of preparing a lithium transition metal oxide, that is, in the step of mixing the positive electrode active material precursor with a lithium-containing raw material and firing the mixture, rather than in the step of preparing a positive electrode active material precursor.

The ammonium ion-containing solution may include one or more selected from the group consisting of $NH_4OH$, $(NH_4)_2SO_4$, $NH_4NO_3$, $NH_4Cl$, $CH_3COONH_4$, and $(NH_4)_2CO_3$. In this case, as a solvent, water, or a mixture of water and an organic solvent (specifically, alcohol, etc.) that can be uniformly mixed with water may be used.

The basic aqueous solution may include one or more selected from the group consisting of NaOH, KOH, and $Ca(OH)_2$, and as a solvent, water, or a mixture of water and an organic solvent (specifically, alcohol, etc.) that can be uniformly mixed with water may be used. In this case, the concentration of the basic aqueous solution may be 5% to 35% by weight, preferably 15% to 35% by weight, and more preferably 20% to 30% by weight. When the concentration of the basic aqueous solution is within the above range, precursor particles having a uniform size can be formed, the precursor particles can be quickly formed, and the yield can be excellent.

Meanwhile, the raw materials are preferably supplied in an amount such that the pH of the reaction solution becomes 12 or more and preferably 12 to 13. In addition, for pH adjustment, the pH may be adjusted by first adding a predetermined amount of the ammonium ion-containing solution and the basic aqueous solution before adding the transition metal-containing solution.

The mode of a precursor formation reaction may vary depending on the pH of the reaction solution. Specifically, when the pH is 12 or more, a particle seed formation reaction dominantly occurs, and when the pH is less than 12, a particle growth reaction dominantly occurs. Therefore, it is preferable to maintain the pH of the reaction solution at 12 or more for at least a certain amount of time at the initial stage of the reaction so that a large number of particle seeds can be formed.

Meanwhile, after particle seeds are sufficiently formed, precursor particles may be grown by adjusting the supply flow rate of the raw materials so that the pH of the reaction solution becomes less than 12.

For example, the pH of the reaction solution may be adjusted to be less than 12, preferably 10 to 11.9, and more preferably 10.5 to 11.7 by adjusting the flow rates of the transition metal-containing solution, the ammonium ion-containing solution, and/or the basic aqueous solution supplied to the reactor. When the transition metal-containing solution is added while adjusting the pH of the reaction solution to be within the above range, a seed formation reaction may be terminated, and a particle growth reaction may take place.

According to the present invention, step (A) may include forming a core portion including randomly aggregated primary particles by carrying out a co-precipitation reaction at a pH of 12 or more, and subsequently forming a shell portion surrounding the core portion and formed of primary particles oriented in a direction from a particle center to the outside by carrying out a co-precipitation reaction at a pH of less than 12. For example, step (A) may include carrying out a co-precipitation reaction at a pH of 12 or more for 0.5 to 6 hours and subsequently carrying out a co-precipitation reaction at a pH of less than 12 for 1 to 96 hours. In this case, since the positive electrode active material precursor has a small core portion and a long shell portion, a positive electrode active material precursor having excellent lithium mobility can be obtained.

Meanwhile, in the above process, the level of the reaction solution inside the reactor gradually rises due to the supply of the raw materials. When the reaction solution in the reactor reaches a certain level, a reaction solution filtrate, from which solids have been removed, may be discharged through the filtering unit so that a co-precipitation reaction is carried out while maintaining a constant level of the reaction solution (second step).

Here, the discharge of the filtrate may be carried out in a continuous manner from a time point at which the level of the reaction solution reached 70% to 100% and preferably 80% to 90% of the total capacity of the reactor. When the discharge of the filtrate is excessively delayed, since the precursor may be caught in pores of a filter used for separating the precursor from the filtrate or clogging may occur, a filtrate flow rate may be reduced, and when the filtrate flow rate is reduced, the level of reaction products may gradually increase and cause the reaction to be terminated. Therefore, it is necessary to consider these outcomes in advance and appropriately adjust the level of the reaction solution to be filtered.

In order to maintain a constant level of the reaction solution in the reactor, it is preferable that a flow rate at which the filtrate is discharged through the filtering unit is the same as the total supply flow rate of the raw materials.

Meanwhile, as the co-precipitation reaction proceeds, precursor particles are formed, and thus the solid content of the reaction solution gradually increases. When the solid content of the reaction solution is excessively high, since the raw materials are not smoothly mixed due to the difficulty of stirring, the co-precipitation reaction occurs unevenly, and thus defects in positive electrode active material precursor quality may occur. This problem can be prevented by terminating the reaction when the solid content is not yet high, but in this case, there is a problem that the effect of increasing productivity is reduced.

However, in the present invention, since the co-precipitation reaction is carried out while maintaining a solids concentration of the reaction solution to be below a specific level by extracting a part of the reaction solution including the positive electrode active material precursor through the extraction unit and discharging the same to a liquid-collecting tank (third step), the problem caused by increased solids content can be solved.

Meanwhile, according to the present invention, the extraction is preferably carried out from a time point at which the particle diameter of the positive electrode active material precursor in the reaction solution reaches the smallest desired particle diameter of the positive electrode active material precursor. This is because, when the extraction begins at this time point, the particle size characteristics of the finally obtained positive electrode active material precursor may not be adversely affected.

In addition, according to the present invention, the extraction is preferably carried out in an amount that maintains the solids concentration of the reaction solution at 85% by weight or less and preferably 60% to 85% by weight. This is because, when the solids concentration of the reaction solution is maintained at 85% by weight or less, stirring is smoothly carried out, and thus the occurrence of defects in positive electrode active material precursor quality can be minimized.

Meanwhile, when positive electrode active material precursor particles grow to a desired size in the reaction solution, the co-precipitation reaction is terminated, the positive electrode active material precursor particles are separated from the reaction solution, washed, and dried, and thus a positive electrode active material precursor powder is obtained. Preferably, the time point at which the co-precipitation reaction is terminated is the same as, for example, the time point at which the particle diameter of the positive electrode active material precursor particles reaches the desired maximum particle diameter of the positive electrode active material precursor particles.

The positive electrode active material precursor is a precursor having a core-shell structure which includes: a core portion; and a shell portion surrounding the core portion and formed of primary particles oriented in a direction from a particle center to the outside. The core portion is formed at the time of particle seed formation and has a form in which primary particles are randomly aggregated without particular orientation.

The shell portion is formed at the time of particle growth and has a form in which primary particles are arranged while having a particular orientation. Specifically, the shell portion has a form in which the primary particles are radially arranged in a direction from a precursor particle center to the outside.

In the core portion, since the primary particles are randomly aggregated, a lithium ion movement path cannot be secured during the intercalation or deintercalation of lithium ions, and thus lithium mobility is low. On the other hand, in the shell portion, since particles are radially arranged, a lithium movement path is secured, and thus lithium mobility is excellent. Therefore, lithium mobility decreases when an area occupied by the core portion in the particle is large, and lithium mobility is improved when an area occupied by the shell portion is large.

Meanwhile, according to the present invention, the positive electrode active material precursor may be represented, for example, by the following Chemical Formula 1 or Chemical Formula 2.

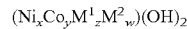     [Chemical Formula 1]

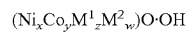     [Chemical Formula 2]

In Chemical Formulas 1 and 2, $M^1$ may be one or more selected from the group consisting of Mn and Al, and $M^2$ may be one or more selected from the group consisting of Zr, B, W, Mo, Cr, Nb, Mg, Hf, Ta, La, Ti, Sr, Ba, Ce, F, P, S, and Y.

In the above, x represents an atomic fraction of Ni among metal elements in the precursor and may satisfy $0.5 \leq x < 1$, $0.6 \leq x < 0.98$, or $0.7 \leq x < 0.95$.

In the above, y represents an atomic fraction of Co among metal elements in the precursor and may satisfy $0 < y \leq 0.5$, $0.01 \leq y \leq 0.4$, or $0.01 \leq y \leq 0.3$.

In the above, z represents an atomic fraction of the $M^1$ element among metal elements in the precursor and may satisfy $0 < z \leq 0.5$, $0.01 \leq z \leq 0.4$, or $0.01 \leq z \leq 0.3$.

In the above, w represents an atomic fraction of the $M^2$ element among metal elements in the precursor and may satisfy $0 \leq w \leq 0.2$, $0 \leq w \leq 0.1$, $0 \leq w \leq 0.05$, or $0 \leq w \leq 0.02$.

Meanwhile, the positive electrode active material precursor prepared by the above-described method of preparing a positive electrode active material precursor has excellent tap density and rolling density characteristics. When a positive electrode active material is manufactured using a positive electrode active material precursor having high tap density and rolling density, a positive electrode active material having high tap density and rolling density can be manufactured, and when the tap density and rolling density of a positive electrode active material are high, there may be an effect of improving the energy density of a battery.

Step (B)

When the above-described positive electrode active material precursor, which includes a core portion including randomly aggregated primary particles and a shell portion surrounding the core portion and formed of primary particles oriented in a direction from a particle center to the outside and in which a ratio of a crystal grain size in the (100) plane to a crystal grain size in the (001) plane of the primary particles forming the shell portion is 3 or more, is mixed with a lithium-containing raw material and fired, a lithium transition metal oxide having an average particle diameter ($D_{50}$) that is 0.01% to 20% reduced as compared to an average particle diameter ($D_{50}$) of the positive electrode active material precursor may be obtained, and the lithium transition metal oxide can be used for manufacturing a positive electrode active material.

In this case, through the process of firing at high temperature, voids between primary particles in which the ratio of a crystal grain size in the (100) plane to a crystal grain size in the (001) plane is 3 or more, that is, primary particles forming the shell portion, are reduced. In conventional positive electrode active material precursors, where the orientation of primary particles is unclear, since the above-described effect of reducing voids is generally canceled out due to the random orientation, a change in secondary particle size before and after firing is not directly observed. However, in the positive electrode active material precursor used in the present invention, since the primary particles of the shell portion are oriented in a specific direction, there may be combined effects in which voids between the primary particles are removed in grain directions, and thus the size of secondary particles can be reduced. Since unnecessary voids present in secondary particles are effectively reduced as such, more dense particles can be formed.

The lithium-containing raw material may be, for example, one or more selected from the group consisting of lithium carbonate ($Li_2CO_3$), lithium hydroxide (LiOH), $LiNO_3$, $CH_3COOLi$, and $Li_2(COO)_2$ and is preferably $Li_2CO_3$, LiOH, or a combination thereof.

When preparing a positive electrode active material, the positive electrode active material precursor and the lithium-containing raw material may be mixed in a molar ratio of 1:1 to 1:1.625 or 1:1 to 1:1.15. When the mixing amount of the lithium-containing raw material is below the above range, the capacity of a prepared positive electrode active material may be reduced, and when the mixing amount of the lithium-containing raw material exceeds the range, unreacted Li may remain as a by-product, capacity may be reduced, and positive electrode active material particles may be separated (coalescence of the positive electrode active material may be caused) after firing.

Meanwhile, as described above, since an $M^1$-(here, $M^1$ is one or more selected from the group consisting of Mn and Al) or $M^2$-(one or more selected from the group consisting of Zr, B, W, Mo, Cr, Nb, Mg, Hf, Ta, La, Ti, Sr, Ba, Ce, F, P, S, and Y) containing raw material in a powder form may be added in the process of mixing the positive electrode active material precursor with the lithium-containing raw material and firing the mixture, a positive electrode active material doped with $M^1$ or $M^2$ can be obtained.

According to the present invention, the firing may be carried out at a temperature of 700° C. to 1,000° C. When the firing temperature is less than 700° C., a raw material may remain in particles due to an insufficient reaction, and thus the high-temperature stability of a battery may be lowered, and since bulk density and crystallinity are lowered, structural stability may be lowered. On the other hand, when the firing temperature exceeds 1,000° C., particles may unevenly grow, and since it is difficult to disintegrate the particles, capacity and the like may be reduced. Meanwhile, in consideration of the particle size control, capacity, and stability of a manufactured positive electrode active material and the reduction of lithium-containing by-products, the firing temperature is more preferably in the range of 700° C. to 980° C.

The firing may be carried out for 5 hours to 35 hours. When the firing time is less than 5 hours, since a reaction time is excessively short, it may be difficult to obtain a highly crystalline positive electrode active material, and when the firing time exceeds 35 hours, the size of particles may become excessively large, and production efficiency may be lowered.

When a positive electrode active material is manufactured under specific conditions using a positive electrode active material precursor, which includes a core portion including randomly aggregated primary particles and a shell portion surrounding the core portion and formed of primary particles oriented in a direction from a particle center to the outside and in which a ratio of a crystal grain size in the (100) plane to a crystal grain size in the (001) plane of the primary particles forming the shell portion is 3 or more, as in the present invention, since positive electrode active material particles become denser, the lithium transition metal oxide prepared in step (B) may have a smaller average particle diameter ($D_{50}$) than the positive electrode active material precursor. Specifically, the lithium transition metal oxide may have an average particle diameter ($D_{50}$) that is 0.01% to 20% and preferably 0.1% to 10% reduced as compared to an average particle diameter ($D_{50}$) of the positive electrode active material precursor.

Step (C)

When the lithium transition metal oxide is mixed with a coating element-containing raw material and thermally treated, a positive electrode active material in which a coating layer is formed on a surface of the lithium transition metal oxide is obtained.

The coating element included in the coating element-containing raw material may be Zr, B, W, Mo, Cr, Nb, Mg, Hf, Ta, La, Ti, Sr, Ba, Ce, F, P, S, Y, or the like. The coating element-containing raw material may be an acetate, nitrate, sulfate, halide, sulfide, hydroxide, oxide, oxyhydroxide, or the like containing the coating element. The coating element-containing raw material may be in a powder state. For example, when the coating element is boron (B), boric acid (B(OH)$_3$) or the like may be used.

The thermal treatment may be carried out at a temperature of 200° C. to 400° C. When the thermal treatment temperature is within the above range, a coating layer can be formed while maintaining the structural stability of the transition metal oxide. The thermal treatment may be carried out for 1 hour to 10 hours. When a thermal treatment time is within the above range, a coating layer can be appropriately formed, and production efficiency can be improved.

According to the present invention, the positive electrode active material manufactured by the above-described method of manufacturing a positive electrode active material may have an average particle diameter (D$_{50}$) of 1 μm to 25 μm. Preferably, the average particle diameter (D$_{50}$) is 5 μm to 15 μm, or 9 μm or more and less than 15 μm. When the average particle diameter of the positive electrode active material is within the above range, since tap density and rolling density are excellent, high energy density can be secured.

According to the present invention, the positive electrode active material manufactured by the above-described method of manufacturing a positive electrode active material may have improved mechanical strength. Specifically, the positive electrode active material may have a particle strength of 100 MPa to 250 MPa. Preferably, the particle strength is 150 MPa to 200 MPa, 160 MPa to 200 MPa, or 160 MPa to 180 MPa. Therefore, when the positive electrode active material is applied to a battery, the capacity characteristics and resistance characteristics of the battery and the like can be improved.

The positive electrode active material may refer to a positive electrode active material which has a secondary particle form formed by the aggregation of primary particles and includes a shell portion including the primary particles oriented in a specific direction, that is, oriented in a direction from a particle center to the outside.

Since the lithium transition metal oxide particles have a reduced average particle diameter as compared to the positive electrode active material precursor particles as described above, the positive electrode active material particles can be formed more densely than the positive electrode active material precursor particles. Therefore, when the positive electrode active material particles are applied to a battery, energy bulk density can be improved, and since mechanical strength is improved, lifetime characteristics can be further improved.

Positive Electrode

Another aspect of the present invention provides a positive electrode for a lithium secondary battery, which includes a positive electrode active material manufactured by the above-described method.

Specifically, the positive electrode includes: a positive electrode current collector; and a positive electrode active material layer disposed on one or more surfaces of the positive electrode current collector and including the above-described positive electrode active material.

The positive electrode current collector is not particularly limited as long as it does not cause a chemical change in a battery and has conductivity, and for example, stainless steel, aluminum, nickel, titanium, calcined carbon, or aluminum or stainless steel whose surface has been treated with carbon, nickel, titanium, silver, or the like may be used. In addition, the positive electrode current collector may typically have a thickness of 3 μm to 500 μm, and the current collector may have fine irregularities formed in a surface thereof to increase the adhesion of the positive electrode active material. The positive electrode current collector may be used in any of various forms such as a film, a sheet, a foil, a net, a porous material, a foam, a non-woven fabric, and the like.

The positive electrode active material layer may include a conductive material and a binder in addition to the positive electrode active material.

In this case, the positive electrode active material may be included in an amount of 80% to 99% by weight and more preferably 85% to 98% by weight based on the total weight of the positive electrode active material layer. When the positive electrode active material is included within the above content range, excellent capacity characteristics can be exhibited.

In this case, the conductive material is used for imparting conductivity to an electrode and can be used without particular limitation as long as it does not cause a chemical change in a battery being manufactured and has electron conductivity. Specific examples thereof include: graphite such as natural graphite or artificial graphite; carbon black such as acetylene black, Ketjen black, channel black, furnace black, lamp black, or thermal black; a carbon-based material such as a carbon fiber; a metal powder or metal fiber such as copper, nickel, aluminum, or silver; a conductive whisker such as zinc oxide or potassium titanate; a conductive metal oxide such as titanium oxide; and a conductive polymer such as a polyphenylene derivative, which may be used alone or in a combination of two or more thereof. The conductive material may be included in an amount of 1% to 30% by weight based on the total weight of the positive electrode active material layer.

The binder serves to improve adhesion between the positive electrode active material particles and between the positive electrode active material and the current collector. Specific examples thereof include polyvinylidene fluoride (PVDF), a vinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene polymer (EPDM), a sulfonated-EPDM, styrene-butadiene rubber (SBR), fluororubber, or various copolymers thereof, which may be used alone or in a combination of two or more thereof. The binder may be included in an amount of 1% to 30% by weight based on the total weight of the positive electrode active material layer.

The positive electrode may be manufactured according to a conventional method of manufacturing a positive electrode except that the above-described positive electrode active material is used. For example, the positive electrode may be manufactured by applying a positive electrode mixture, which was prepared by dissolving or dispersing the above-described positive electrode active material and optionally a binder and a conductive material in a solvent, onto the positive electrode current collector and then drying and roll-pressing the resultant, or by casting the positive electrode mixture on a separate support and laminating a film obtained by delamination from the support on the positive electrode current collector. In this case, the types and contents of the positive electrode active material, the binder, and the conductive material are the same as described above.

The solvent may be a solvent commonly used in the art, for example, dimethyl sulfoxide (DMSO), isopropyl alcohol, N-methylpyrrolidone (NMP), acetone, water, or the like, which may be used alone or in a combination of two or more thereof. The usage amount of the solvent is sufficient if it can dissolve or disperse the positive electrode active material, the conductive material, and the binder in consideration of the coating thickness of a slurry and a production yield and, at a later point in time, achieve a viscosity capable of exhibiting excellent thickness uniformity when the slurry is applied to manufacture a positive electrode.

Lithium Secondary Battery

In addition, according to the present invention, an electrochemical device including the above-described positive electrode may be manufactured. The electrochemical device may specifically be a battery, a capacitor, or the like, and more specifically, a lithium secondary battery.

Specifically, the lithium secondary battery includes a positive electrode, a negative electrode disposed to face the positive electrode, a separator interposed between the positive electrode and the negative electrode, and an electrolyte, and since the positive electrode is the same as described above, a detailed description thereof will be omitted, and only the remaining configuration will be described in detail below.

In addition, the lithium secondary battery may optionally further include: a battery case for accommodating an electrode assembly including the positive electrode, the negative electrode, and the separator; and a sealing member for sealing the battery case.

In the lithium secondary battery, the negative electrode includes a negative electrode current collector and a negative electrode active material layer disposed on the negative electrode current collector.

The negative electrode current collector is not particularly limited as long as it does not cause a chemical change in a battery and has high conductivity, and for example, copper, stainless steel, aluminum, nickel, titanium, calcined carbon, copper or stainless steel whose surface has been treated with carbon, nickel, titanium, silver, or the like, an aluminum-cadmium alloy, or the like may be used. In addition, the negative electrode current collector may typically have a thickness of 3 μm to 500 μm, and like in the case of the positive electrode current collector, the current collector may have fine irregularities formed in a surface thereof to increase the adhesion of a negative electrode active material. The negative electrode current collector may be used in any of various forms such as a film, a sheet, a foil, a net, a porous material, a foam, a non-woven fabric, and the like.

The negative electrode active material layer may optionally include a binder and a conductive material in addition to the negative electrode active material.

As the negative electrode active material, a compound capable of reversible intercalation and deintercalation of lithium may be used. Specific examples of the negative electrode active material include: a carbonaceous material such as artificial graphite, natural graphite, graphitized carbon fiber, or amorphous carbon; a metallic compound capable of alloying with lithium, such as Si, Al, Sn, Pb, Zn, Bi, In, Mg, Ga, Cd, an Si alloy, an Sn alloy, or an Al alloy; a metal oxide capable of doping and dedoping lithium, such as $SiO_\beta$ (0<β<2), $SnO_2$, vanadium oxide, or lithium vanadium oxide; or a composite including the metallic compound and the carbonaceous material, such as an Si—C composite or an Sn—C composite, which may be used alone or in a combination of two or more thereof. In addition, a lithium metal thin film may be used as the negative electrode active material. In addition, any of low-crystallinity carbon, high-crystallinity carbon, and the like may be used as the carbonaceous material. Representative examples of the low-crystallinity carbon include soft carbon and hard carbon, and representative examples of the high-crystallinity carbon include amorphous, platy, scaly, spherical, or fibrous natural graphite or artificial graphite, Kish graphite, pyrolytic carbon, mesophase pitch-based carbon fiber, meso-carbon microbeads, mesophase pitches, and high-temperature calcined carbon such as petroleum or coal tar pitch-derived cokes and the like.

The negative electrode active material may be included in an amount of 80% to 99% by weight based on the total weight of the negative electrode active material layer.

The binder is a component that aids in binding between the conductive material, the active material, and the current collector and may typically be included in an amount of 0.1% to 10% by weight based on the total weight of the negative electrode active material layer. Examples of the binder include PVDF, polyvinyl alcohol, CMC, starch, hydroxypropyl cellulose, regenerated cellulose, polyvinylpyrrolidone, tetrafluoroethylene, polyethylene, polypropylene, an EPDM, a sulfonated-EPDM, SBR, nitrile-butadiene rubber, fluororubber, various copolymers thereof, and the like.

The conductive material is a component for further improving the conductivity of the negative electrode active material and may be included in an amount of 10% by weight or less and preferably 5% by weight or less based on the total weight of the negative electrode active material layer. Such a conductive material is not particularly limited as long as it does not cause a chemical change in a battery being produced and has conductivity, and for example, graphite such as natural graphite or artificial graphite, carbon black such as acetylene black, Ketjen black, channel black, furnace black, lamp black, or thermal black, a conductive fiber such as carbon fiber or metal fiber, a conductive fiber such as a carbon fiber or a metal fiber, fluorocarbon, a metal powder such as an aluminum powder or a nickel powder, a conductive metal oxide such as titanium oxide, and a conductive material such as a polyphenylene derivative may be used.

The negative electrode may be manufactured by applying a negative electrode mixture, which was prepared by dissolving or dispersing the negative electrode active material and optionally a binder and a conductive material in a solvent, onto the negative electrode current collector and then drying the same, or by casting the negative electrode mixture on a separate support and laminating a film obtained by delamination from the support on the negative electrode current collector.

Meanwhile, in the lithium secondary battery, the separator is used for separating the negative electrode and the positive electrode and providing a passage for lithium ion migration, and any separator commonly used in a lithium secondary battery may be used without particular limitation, and in particular, a separator that exhibits low resistance to the migration of electrolyte ions and has an excellent electrolyte impregnation ability is preferred. Specifically, a porous polymer film, for example, a porous polymer film formed of a polyolefin-based polymer such as an ethylene homopolymer, a propylene homopolymer, an ethylene/butene copolymer, an ethylene/hexene copolymer, or an ethylene/methacrylate copolymer or a stacked structure having two or more layers thereof, may be used. In addition, a common porous non-woven fabric, for example, a non-woven fabric made of high-melting-point glass fiber, a polyethylene terephthalate fiber, or the like, may be used. Also, in order to ensure heat resistance or mechanical strength, a coated separator that includes a ceramic component or polymer material and is optionally in a single-layer or multi-layer structure may be used.

In addition, examples of the electrolyte used in the present invention may include an organic liquid electrolyte, an inorganic liquid electrolyte, a solid polymer electrolyte, a gel-type polymer electrolyte, an inorganic solid electrolyte, a molten-type inorganic electrolyte, and the like which are usable for manufacturing a lithium secondary battery, but the present invention is not limited thereto.

Specifically, the electrolyte may include an organic solvent and a lithium salt.

As the organic solvent, any organic solvent that can serve as a medium through which ions involved in an electrical reaction of a battery can move may be used without particular limitation. Specifically, as the organic solvent, an ester-based solvent such as methyl acetate, ethyl acetate, γ-butyrolactone, or ε-caprolactone, an ether-based solvent such as dibutyl ether or tetrahydrofuran, a ketone-based solvent such as cyclohexanone, an aromatic hydrocarbon-based solvent such as benzene or fluorobenzene, a carbonate-based solvent such as dimethyl carbonate (DMC), diethyl carbonate (DEC), methyl ethyl carbonate (MEC), ethyl methyl carbonate (EMC), ethylene carbonate (EC), or propylene carbonate (PC), an alcohol-based solvent such as ethyl alcohol or isopropyl alcohol, a nitrile such as R—N (R is a C2-C20 hydrocarbon group having a linear, branched, or cyclic structure and may include a double-bonded aromatic ring or an ether bond), an amide such as dimethylformamide, a dioxolane such as 1,3-dioxolane, a sulfolane, or the like may be used. Among these, a carbonate-based solvent is preferable, and a combination of a cyclic carbonate having high ionic conductivity and a high dielectric constant, which is capable of improving the charging/discharging performance of a battery (e.g., EC, PC, etc.), and a linear carbonate-based compound having low viscosity (e.g., EMC, DMC, DEC, etc.) is more preferable. In this case, when the cyclic carbonate and the linear carbonate are mixed in a volume ratio of about 1:1 to about 1:9 and used, the performance of the electrolyte can be excellent.

As the lithium salt, any compound capable of providing lithium ions used in a lithium secondary battery may be used without particular limitation. Specifically, as the lithium salt, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, $LiB(C_2O_4)_2$, or the like may be used. The lithium salt is preferably used at a concentration within the range of 0.1 to 2.0 M. When the concentration of the lithium salt satisfies this range, since the electrolyte has appropriate conductivity and viscosity, the performance of the electrolyte can be excellent, and the lithium ions can effectively move.

In the electrolyte, in addition to the above-described electrolyte components, one or more additives, for example, a haloalkylene carbonate-based compound (e.g., difluoroethylene carbonate), pyridine, triethyl phosphite, triethanolamine, a cyclic ether, ethylenediamine, n-glyme, hexamethylphosphate triamide, a nitrobenzene derivative, sulfur, a quinone imine dye, an N-substituted oxazolidinone, an N,N-substituted imidazolidine, an ethylene glycol dialkyl ether, an ammonium salt, pyrrole, 2-methoxyethanol, aluminum trichloride, and the like may be included for the purpose of enhancing the lifetime characteristics of a battery, suppressing a reduction in battery capacity, enhancing the discharge capacity of a battery, and the like. In this case, the additive may be included in an amount of 0.1% to 5% by weight based on the total weight of the electrolyte.

A secondary battery including the positive electrode active material of the present invention stably exhibits excellent discharge capacity, excellent output characteristics, and excellent lifetime characteristics and thus can be usefully applied to portable devices such as mobile phones, laptop computers, and digital cameras and an electric automobile field such as hybrid electric vehicles (HEVs).

Accordingly, still another aspect of the present invention provides a battery module including the above-described lithium secondary battery as a unit cell and a battery pack including the same.

The battery module or the battery pack is applicable as a power source for one or more medium-to-large sized devices selected from among power tools, electric vehicles (EVs), including HEVs and plug-in hybrid electric vehicles (PHEVs), and power storage systems.

The external shape of the lithium secondary battery of the present invention is not particularly limited but may be a cylindrical type using a can, a prismatic type, a pouch type, a coin type, or the like.

The lithium secondary battery of the present invention can be used for a battery cell used as a power source of a small device and can be preferably used as a unit battery in medium-to-large sized battery modules including a plurality of battery cells.

[Modes of the Invention]

Hereinafter, exemplary embodiments of the present invention will be described in detail so that those of ordinary skill in the art can easily implement the present invention. However, the present invention can be implemented in various different forms and is not limited to the embodiments described herein.

EXAMPLES AND COMPARATIVE EXAMPLES

A transition metal-containing solution, an ammonium ion-containing solution, and a basic aqueous solution used in the following Examples and Comparative Examples are as follows.

(A) Transition metal-containing solution

2 M transition metal-containing solution prepared by dissolving $NiSO_4$, $CoSO_4$, and $MnSO_4$ in distilled water in the amounts such that the molar ratio of Ni:Co:Mn is 0.88:0.05:0.07

(B) Ammonium ion-containing solution

15% (w/w) aqueous $NH_4OH$ solution (C) Basic aqueous solution

25% (w/w) aqueous NaOH solution

Example 1

20% of the total volume of a reactor equipped with a filter and a pump was filled with distilled water, and dissolved oxygen in the water was removed by purging the reactor with nitrogen gas at a rate of 10 L/min. Subsequently, the aqueous $NH_4OH$ solution was added in an amount of 5 parts by weight relative to 100 parts by weight of the distilled water, an aqueous NaOH solution was added and thus the pH was maintained at 12.2, a temperature inside the continuous reactor was maintained at 50° C., and stirring was performed at a stirring speed of 250 rpm.

Subsequently, each of the transition metal-containing solution, the aqueous $NH_4OH$ solution, and the aqueous NaOH solution was continuously supplied to the reactor at a rate of 250 ml/min, 40 ml/min, and a rate suitable for maintaining the pH of the reaction solution at 12.2, respectively, and a co-precipitation reaction was carried out for two hours while stirring to form seeds for positive electrode active material precursor particles.

When the reaction solution reached a full level during the co-precipitation reaction, the filter was operated to discharge a filtrate in a continuous manner so that a constant level of the reaction solution was maintained.

Subsequently, the aqueous NaOH solution and the aqueous NH$_4$OH solution were further added to adjust the pH of the reaction solution to 11.6, and a co-precipitation reaction was additionally performed for 86 hours to grow positive electrode active material precursor particles.

When the particle diameter of the positive electrode active material precursor particles formed in the reactor during the additional co-precipitation reaction reached 14.5 μm, the pump was operated to extract a part of the reaction solution including the positive electrode active material precursor particles and discharge the same to a liquid-collecting tank at a rate of 1 L/hr until the reaction was terminated, and thus the solids concentration of the reaction solution was maintained at 85% or less.

Subsequently, the positive electrode active material precursor particles formed in the above were separated from the reaction solution, washed, and dried for 24 hours in a dryer at 130° C., and thus a positive electrode active material precursor having a stoichiometric formula of $Ni_{0.88}Co_{0.005}Mn_{0.07}(OH)_2$ was obtained.

After mixing 20 kg of the positive electrode active material precursor prepared in the above with 9.541 kg of LiOH·H$_2$O and 225 g of Al(OH)$_3$ so that the amount of LiOH·H$_2$O was 1.03 equivalents of the amount of the precursor, the mixture was fired at 765° C. in an oxygen atmosphere for 13.5 hours, and thus a lithium transition metal oxide having a stoichiometric formula of $Li(Ni_{0.86}Co_{0.05}Mn_{0.07}Al_{0.02})O_2$ was obtained.

After washing the lithium transition metal oxide prepared in the above, a B(OH)$_3$ powder was added to the lithium transition metal oxide to have a concentration of 1,000 ppm, the mixture was thermally treated at 295° C. for five hours, and thus a positive electrode active material in which a coating layer was formed on a surface of the lithium transition metal oxide was obtained.

Example 2

A positive electrode active material was manufactured in the same manner as in Example 1 except that a co-precipitation reaction time was adjusted to one hour during the formation of seeds for positive electrode active material precursor particles, and when the particle diameter of the positive electrode active material precursor particles formed in the reactor during the additional co-precipitation reaction reached 9.5 μm, the pump was operated to extract a part of the reaction solution including the positive electrode active material precursor particles and discharge the same.

Comparative Example 1

A positive electrode active material was manufactured in the same manner as in Example 1 except that a precursor having an average particle diameter ($D_{50}$) of 15 μm and represented as $Ni_{0.88}Co_{0.05}Mn_{0.07}(OH)_2$ was purchased from Zoomwe Science and Technology Company and used.

Experimental Examples

Experimental Example 1: Evaluation of Ratio of Crystal Grain Size in (100) Plane to Crystal Grain Size in (001) Plane of Primary Particles Forming Shell Portion of Positive Electrode Active Material Precursor After analyzing the positive electrode active material precursors of Examples 1, 2, and Comparative Example 1 by XRD, a ratio of a crystal grain size in the (100) plane to a crystal grain size in the (001) plane of primary particles forming a shell portion was calculated by dividing a crystal grain size determined using an FWHM of a (100) peak of the XRD data by a crystal grain size determined using an FWHM of a (001) peak, and the results are shown in Table 1 and used as a measure of orientation.

In the shell portion surrounding a core portion and formed of primary particles oriented in a direction from a particle center to the outside, when the ratio of a crystal grain size in the (100) plane to a crystal grain size in the (001) plane of the primary particles forming the shell portion is 3 or more, it can be determined that the primary particles exhibit a pronounced orientation.

TABLE 1

| | Ratio of crystal grain size in (100) plane to crystal grain size in (001) plane of primary particles forming shell portion |
|---|---|
| Example 1 | 3.287 |
| Example 2 | 3.018 |
| Comparative Example 1 | 1.711 |

Experimental Example 2: Evaluation of Properties of Positive Electrode Active Material Precursor and Positive Electrode Active Material (1) Average Particle Diameter ($D_{50}$)

Using a particle size distribution measuring instrument (S3500 manufactured by Microtrac Retsch GmbH), the average particle diameters of the positive electrode active material precursors and positive electrode active materials of Examples 1, 2, and Comparative Example 1 were measured, and the results are shown in Table 2 below.

(2) Particle Strength

Samples of the positive electrode active materials of Examples 1, 2, and Comparative Example 1 were prepared, and while applying pressure to the collected samples and increasing the pressure, the time points at which the cracking of the positive electrode active material particles started was measured and converted into a pressure unit (MPa). The results are shown in the following Table 2.

TABLE 2

| | Positive electrode active material precursor | Positive electrode active material | |
|---|---|---|---|
| | Average particle diameter ($D_{50}$) (μm) | Average particle diameter ($D_{50}$) (μm) | Particle strength (MPa) |
| Example 1 | 15.0 | 14.5 | 160 |
| Example 2 | 10.1 | 9.7 | 168 |
| Comparative Example 1 | 15.0 | 15.0 | 123 |

Referring to Table 1 and Table 2, it can be seen that in the case of Examples 1 and 2, since the positive electrode active materials were manufactured from positive electrode active material precursors in which primary particles forming a shell portion exhibited a pronounced orientation in a direction from a particle center to the outside and a ratio of a crystal grain size in the (100) plane to a crystal grain size in the (001) plane of the primary particles forming the shell portion was 3 or more, the particle strength of the positive electrode active materials was significantly higher than that of the positive electrode active material of Comparative Example 1.

Meanwhile, in the case of Examples 1 and 2, it can be seen that the average particle diameters of the positive electrode active materials (lithium transition metal oxides) were respectively 3.3% and 4.0% smaller than the average particle diameters of the positive electrode active material precursors, but in the case of Comparative Example 1, the average particle diameter of the positive electrode active material was the same as the average particle diameter of the positive electrode active material precursor. That is, it can be seen that when a positive electrode active material is manufactured according to the manufacturing method of the present invention, due to the decrease in particle size, particle density is excellent.

Experimental Example 3: Evaluation of Ratio of Shell Portion Length to Core Portion Diameter of Positive Electrode Active Material Precursor Cross-sections of the positive electrode active material precursors of Examples 1, 2, and Comparative Example 1 were photographed with a scanning electron microscope to measure a core portion diameter and a shell portion length, and a ratio of the shell portion length to the core portion diameter is shown in the following Table 3.

TABLE 3

| | Core portion diameter (μm) | Shell portion length (μm) | Ratio of shell portion length to core portion diameter |
|---|---|---|---|
| Example 1 | 4.8 | 5.1 | 1.06 |
| Example 2 | 3.2 | 3.5 | 1.09 |
| Comparative Example 1 | 4.7 | 5.2 | 1.11 |

Experimental Example 4: Evaluation of Battery Characteristics

Lithium secondary batteries were manufactured using the positive electrode active materials manufactured in Examples 1, 2, and Comparative Example 1, and capacities of the lithium secondary batteries were evaluated.

Specifically, each of the positive electrode active materials manufactured in Examples 1, 2, and Comparative Example 1 was mixed with an FX35 conductive material and a KF9700/BM730H binder in a weight ratio of 97.5:1:1.35:0.15 in an NMP solvent to prepare a positive electrode slurry. The positive electrode slurry was applied onto one side of an aluminum current collector, dried at 130° C., and roll-pressed, and thus a positive electrode was obtained. Meanwhile, an Li metal disk was used as a negative electrode active material. After manufacturing an electrode assembly by interposing a separator between the positive electrode manufactured in the above and the negative electrode, the electrode assembly was placed inside a battery case, an electrolyte was injected into the case, and thus a lithium secondary battery was obtained. In this case, as the electrolyte, an electrolyte prepared by dissolving $LiPF_6$ in an EC/EMC/DEC (3/3/4 v/v) organic solvent at a concentration of 1 M was injected, and thus a lithium secondary battery was manufactured.

The lithium secondary batteries manufactured as described above were charged at 25° C. with a constant current of 0.1 C until a voltage of 4.25 V was reached, and then were charged with a constant voltage of 4.25 V until 0.05 C. Subsequently, the lithium secondary batteries were discharged with a constant current of 0.1 C until a voltage of 3.0 V was reached. Charging capacity and discharge capacity values are shown in Table 4.

In addition, the capacities of the lithium secondary batteries were measured by repeatedly charging and discharging the batteries with a constant current of 0.33 C at 45° C. within a range of 3.0 to 4.25 V over 30 charging/discharging cycles, and in particular, a capacity retention rate was measured as a percentage of capacity at the 30th cycle relative to capacity at the first cycle and is shown in Table 4 below. In addition, at each cycle, resistance at high temperature was measured by measuring a voltage drop for 60 seconds after the start of discharging and dividing the voltage drop by the value of applied current, and in particular, the rate of increase of a resistance value at the 30th cycle relative to a resistance value at the first cycle was calculated and is shown in Table 4.

TABLE 4

| | Charge capacity (mAh/g) | Discharge capacity (mAh/g) | Efficiency (%) | Capacity retention rate (%, at 30th cycle) | Rate of increase in resistance (%, 30 cycles) |
|---|---|---|---|---|---|
| Example 1 | 232.7 | 211.1 | 90.7 | 96.3 | 52.8 |
| Example 2 | 233.4 | 213.2 | 91.3 | 96.1 | 49.3 |
| Comparative Example 1 | 229.6 | 203.7 | 88.7 | 96.4 | 71.2 |

Referring to Tables 1 to 4, it can be seen that in the case of secondary batteries including the positive electrode active materials of Examples 1 and 2 manufactured using positive electrode active material precursors in which a ratio of a crystal grain size in the (100) plane to a crystal grain size in the (001) plane of primary particles forming a shell portion was 3 or more, excellent charge/discharge capacity characteristics and excellent battery efficiency were exhibited as compared to in the case of a secondary battery including the positive electrode active material of Comparative Example 1 manufactured using a positive electrode active material precursor in which a ratio of a crystal grain size in the (100) plane to a crystal grain size in the (001) plane of primary particles forming a shell portion was less than 3.

In addition, it can be seen that in the case of secondary batteries including the positive electrode active materials of Examples 1 and 2, considering the fact that a rate of increase of a resistance value at a 30th cycle relative to a resistance value at a first cycle was significantly lower than in the case of a secondary battery including the positive electrode active material of Comparative Example 1, the effect of improving resistance characteristics was excellent.

Therefore, it can be seen that when a positive electrode active material is manufactured using a positive electrode active material precursor which includes a core portion including randomly aggregated primary particles and a shell portion surrounding the core portion and formed of primary particles oriented in a direction from a particle center to the outside and in which a ratio of a shell portion length relative to a core portion diameter is 1 or more and a ratio of a crystal grain size in the (100) plane to a crystal grain size in the (001) plane of the primary particles forming the shell portion is 3 or more, since lithium transition metal oxide particles are a specific percent smaller than positive electrode active material precursor particles, the density of particles is increased and thus the mechanical strength of the positive electrode active material can be improved, and when this positive electrode active material is applied to a secondary battery, the capacity characteristics of the battery and the like can be improved.

The invention claimed is:

1. A method of manufacturing a positive electrode active material, comprising:
   (A) preparing a positive electrode active material precursor which includes a core portion including randomly aggregated primary particles and a shell portion surrounding the core portion and formed of primary particles oriented in a direction from a particle center to the outside and in which a ratio of a crystal grain size in the (100) plane to a crystal grain size in the (001) plane of the primary particles forming the shell portion is 3 or more; and
   (B) mixing the positive electrode active material precursor with a lithium-containing raw material and firing the mixture, and thus preparing a lithium transition metal oxide,
   wherein the lithium transition metal oxide has an average particle diameter ($D_{50}$) that is 0.01% to 20% reduced as compared to an average particle diameter ($D_{50}$) of the positive electrode active material precursor.

2. The method of claim 1, wherein, in the positive electrode active material precursor, a ratio of a crystal grain size in the (100) plane to a crystal grain size in the (001) plane of the primary particles forming the shell portion is in a range of 3 to 6.

3. The method of claim 1, wherein, in the positive electrode active material precursor, a ratio of a shell portion length to a core portion diameter is 1 or more.

4. The method of claim 1, wherein the step (A) includes a method of preparing the positive electrode active material precursor, the method including:
   a first step of forming positive electrode active material precursor particles by a co-precipitation reaction while supplying raw materials to a reactor having a filtering unit and an extraction unit;
   a second step of maintaining a constant level of a reaction solution by discharging a reaction solution filtrate, from which solids have been removed, through the filtering unit when the reaction solution reaches a specific level in the reactor; and
   a third step of maintaining a solids concentration of the reaction solution to be below a specific level by extracting a part of the reaction solution including the positive electrode active material precursor through the extraction unit and discharging the same to a liquid-collecting tank.

5. The method of claim 1, wherein the step (A) includes:
   carrying out a co-precipitation reaction at a pH of 12 or more and thus forming a core portion including randomly aggregated primary particles; and
   subsequently carrying out a co-precipitation reaction at a pH of less than 12 and thus forming a shell portion surrounding the core portion and formed of primary particles oriented in a direction from a particle center to the outside.

6. The method of claim 4, wherein, in the third step, the extracting of the part of the reaction solution is carried out from a time point at which a particle diameter of the positive electrode active material precursor in the reaction solution reaches a smallest desired particle diameter of the positive electrode active material precursor.

7. The method of claim 4, wherein, in the third step, the solids concentration of the reaction solution is maintained at 85% by weight or less.

8. The method of claim 1, wherein, in the step (B), the firing is carried out at a temperature of 700° C. to 1,000° C. for 5 hours to 35 hours.

9. The method of claim 1, further comprising:
   (C) mixing the lithium transition metal oxide with a coating element-containing raw material and thermally treating the mixture and thus forming a coating layer on a surface of the lithium transition metal oxide.

10. The method of claim 1, wherein the positive electrode active material precursor is represented by the following Chemical Formula 1 or Chemical Formula 2:

$$(Ni_xCo_yM^1_zM^2_w)(OH)_2 \qquad \text{[Chemical Formula 1]}$$

$$(Ni_xCo_yM^1_zM^2_w)O\cdot OH \qquad \text{[Chemical Formula 2]}$$

wherein, in Chemical Formula 1 and Chemical Formula 2, $0.5 \le x \le 1$, $0 \le y \le 0.5$, $0 \le z \le 0.5$, and $0 \le w \le 0.2$, $M^1$ is one or more selected from the group consisting of Mn and Al, and $M^2$ is one or more selected from the group consisting of Zr, B, W, Mo, Cr, Nb, Mg, Hf, Ta, La, Ti, Sr, Ba, Ce, F, P, S, and Y.

11. The method of claim 1, wherein the positive electrode active material has an average particle diameter ($D_{50}$) of 1 μm to 25 μm.

12. The method of claim 1, wherein the positive electrode active material has a particle strength of 100 MPa to 250 MPa.

13. The method of claim 5, wherein the pH for the carrying out the co-precipiation reaction and thus forming the core portion including randomly aggregated primary particles, the step (A) includes is a pH of 12 to 13.

14. The method of claim 5, wherein the pH for the subsequently carrying out the co-precipitation reaction and thus forming the shell portion surrounding the core portion and formed of the primary particles oriented in the direction from the particle center to the outside is a pH of 10 to 11.9.

* * * * *